United States Patent [19]

Long et al.

[11] Patent Number: 5,209,387
[45] Date of Patent: May 11, 1993

[54] GAS FILM CONVEYOR FOR ELONGATED STRIPS OF WEB MATERIAL

[75] Inventors: Michael Long; Thomas W. Palone, both of Rochester; Paul Kemp, Churchville, all of N.Y.

[73] Assignee: Eastman Kodak Company, Rochester, N.Y.

[21] Appl. No.: 586,093

[22] Filed: Sep. 20, 1990

[51] Int. Cl.⁵ .................. B65G 51/02; B65H 20/14
[52] U.S. Cl. .................................. 226/97; 406/88; 226/196; 34/156
[58] Field of Search ............... 406/88; 271/194, 195; 226/7, 97, 196; 34/156

[56] References Cited

U.S. PATENT DOCUMENTS

| | | | |
|---|---|---|---|
| 3,181,916 | 5/1965 | Epstein | 302/29 |
| 3,231,165 | 1/1966 | Wallin et al. | 226/97 |
| 3,350,140 | 10/1967 | Strydom | 302/31 |
| 3,385,490 | 5/1968 | Malmgren et al. | 226/7 |
| 3,405,977 | 10/1968 | Albright | 302/29 |
| 3,610,696 | 10/1971 | Fulton | 302/31 |
| 3,614,168 | 10/1971 | Range | 302/31 |
| 3,705,676 | 12/1972 | Overly et al. | 226/97 |
| 3,706,475 | 12/1972 | Yakubowski | 302/31 |
| 3,747,922 | 7/1973 | Groeber | 271/74 |
| 3,771,239 | 11/1973 | Minoda et al. | 34/156 |
| 3,774,972 | 11/1973 | Grapengiesser et al. | 302/29 |
| 3,874,621 | 4/1975 | Blair et al. | 226/88 X |
| 3,953,076 | 4/1976 | Hurd | 302/2 R |
| 3,976,330 | 8/1976 | Babinski et al. | 302/2 R |
| 4,010,981 | 3/1977 | Hodge | 302/2 R |
| 4,081,201 | 3/1978 | Hassan et al. | 302/2 R |
| 4,085,522 | 4/1978 | Stroszynski | 34/156 |
| 4,131,320 | 12/1978 | Volat et al. | 302/2 R |
| 4,165,132 | 8/1979 | Hassan et al. | 406/10 |
| 4,218,001 | 8/1980 | Vits | 226/97 |
| 4,354,686 | 10/1982 | Imanishi et al. | 226/97 X |
| 4,395,165 | 7/1983 | DeRobertis et al. | 406/88 |
| 4,456,406 | 6/1984 | Lenhart | 406/88 |
| 4,474,320 | 10/1984 | Rueger | 226/97 |
| 4,493,548 | 1/1985 | Ateya | 355/3 FU |
| 4,732,513 | 3/1988 | Lenhart | 406/88 |
| 4,744,702 | 5/1988 | Wiseman et al. | 406/88 |

OTHER PUBLICATIONS

IBM Technical Disclosure Bulletin, "Flexible Channel for Web Guiding," Rueger et al, Dec. 1974.

*Primary Examiner*—Joseph J. Hail, III
*Assistant Examiner*—Paul T. Bowen
*Attorney, Agent, or Firm*—Charles E. Snee, III

[57] ABSTRACT

Non-contact air film conveyors are suited for conveying elongated strips (46) of web material such as photographic film and include a track plate (12) having gas flow apertures (20,24; 72,74) extending through its thickness at angles to the surface of the track plate ($\alpha,\alpha'$) and to the direction of movement of the strips ($\beta,\beta', \gamma$). By directing air flow through some apertures (72,74) counter to the direction of movement, speed and acceleration control is achieved independent of the support given to the strips by air flow through other apertures (20,24). Baffles (28-36) and curved side walls (70,96) direct air back onto the film to flatten it during movement.

20 Claims, 4 Drawing Sheets

GAS FILM CONVEYOR FOR ELONGATED STRIPS OF WEB MATERIAL

DESCRIPTION

1. Technical Field

The present invention is related to conveyors for elongated strips of web material. More particularly, the invention relates to gas film conveyors for such strips in which the strip is supported above and propelled along a path by a flow of gas, typically pressurized air, which is directed against the underside of the strip.

2. Background Art

Quite a variety of conveyors of this sort have been described in the patent literature. For example, U.S. Pat. No. 3,181,916 discloses a pneumatic conveyor for light weight articles in which a sheet metal partition is provided with transversely extending slits through which air is blown in the direction of movement. U.S. Pat. No. 3,385,490 shows an apparatus for conveying web or sheet material in which a central line of exhaust openings extends between a pair of rows of air supply openings through which air is blown in the direction of movement. U.S. Pat. No. 3,747,922 discloses a pneumatic transport track for letter mail documents in which a vertical wall is pierced by pairs of angled and normal apertures through which air is blown in, and perpendicular to, the direction of movement. U.S. Pat. No. 3,953,076 teaches that articles such as plastic bottles may be conveyed between constraining side walls joined at their lower ends by a plate having angled transverse slits and normal perforations through which air is blown. U.S. Pat. Nos. 4,081,201 and 4,165,132 disclose an air film transportation system for silicon wafers in which parallel rows of apertures are provided in a base plate, the apertures being angled toward the centerline of the base plate and the rows being separated by exhaust channels which carry away air blown through the apertures against the undersides of the wafers. U.S. Pat. No. 4,395,165 shows a conveyor for electronic chips in which the base plate of the apparatus is provided near its longitudinal edges with parallel rows of apertures angled upward and toward the centerline of the base plate, through which air is blown to transport the chips. Commonly assigned U.S. Pat. No. 4,493,548 discloses an air film device for supporting flexible members such as sheets of paper in which parallel rows of apertures and exhaust channels are arranged in an outwardly diverging array oblique to the path of travel of the flexible member.

Air film conveyors of the types shown in these prior art patents typically have relied upon a rather large number of large flow area air jets coupled with a system of exhaust passages for removal of excess air. This type of conveyor consumes large quantities of air, is undesirably noisy and is expensive to manufacture. Many of such prior art conveyors develop a significant pressure buildup several meters along the conveyor when operated in an enclosed condition, due to the accumulation of excess air. Such pressure buildup significantly reduces the velocity of the conveyed web in the region, even bringing the web to a momentary standstill. Downstream of such a high pressure region, the large volume of exhaust air flowing over the upper surface of the web can cause intense fluttering of the web, leading to abrasion of its surfaces and edges. Reducing the inlet air pressure reduces the accumulation of excess air but also reduces the air film conveyor's ability to support the web without contact. A much larger enclosure or much larger exhaust ports apparently would be required to achieve acceptable performance in such prior art conveyors.

While such known air film conveyors have been applied rather widely, a need has continued to exist for such a conveyor which can convey strips of web material, such as photographic film or other materials having surface coatings or finishes sensitive to contact by adjacent surfaces during conveying. In the case of photographic film, for example, it is vital that the film not become scratched during movement due to contact either with the base plate of the conveyor or with adjacent structure such as enclosing covers or edge guides. A need has existed for such a conveyor which is capable of projecting the leading end of the strip of web material across an open gap at the discharge end of the conveyor, thus facilitating delivery of strips to different stations for subsequent treatment. A need has also existed for such conveyors which can convey strips of web material without requiring quantities of air comparable to the needs of prior art conveyors and without generating undue levels of noise.

SUMMARY OF THE INVENTION

The primary objective of this invention is to provide a pneumatic conveyor for strips of web material, particularly photographic film, which is capable of moving such strips at relatively high speeds without scratching or otherwise damaging the strips.

A further objective of this invention is to provide such a pneumatic conveyor which is simple in construction but sufficiently rugged for a production environment.

A further objective of this invention is to provide such a pneumatic conveyor which is capable of conveying webs having a significant amount of longitudinal or transverse curl, or both, when inserted into the conveyor.

Yet another objective of this invention is to provide such a pneumatic conveyor in which the propulsion force applied to, and tension generated within, the web can be controlled with reasonable precision by adjusting the gas pressure or changing the size or angle of the gas flow apertures.

Still another objective of this invention is to provide such a pneumatic conveyor in which the strip of web material leaves the discharge end of the conveyor with sufficient velocity and low degree of flutter to enable it to jump a short gap to another apparatus for subsequent treatment.

These objectives are given only by way of illustrative examples; thus, other desirable objectives and advantages inherently achieved by the disclosed invention may occur or become apparent to those skilled in the art. Nonetheless, the scope of the invention is to be limited only by the appended claims.

In one embodiment of the invention, an air film conveyor for elongated strips of material, such as photographic film, comprises an elongated track plate having side edges and an upper surface. Where the strips have varying transverse curvatures upward or downward, the upper surface preferably is substantially flat. Where the strips have essentially constant transverse curvatures, a curvature slightly less than that of the strip preferably is provided in the upper surface. A pneumatic pressure chamber is positioned beneath and bounded on its upper side by the track plate and is connected to a means for directing pressurized air into the chamber. Substantially at the center of the track plate is provided at least one first row of gas flow apertures which extend through the track plate from the pressure chamber. The apertures are angled relative to the upper surface of the track plate in the direction of movement through the conveyor and also are alternately angled toward one and then the other of the side edges. Thus, gas flowing through the apertures supports the strips above the track plate and propels them in the direction of movement. A cover may be positioned about the track plate to define a passage through which the strips move, and the cover may be provided with means for guiding the edges of the strips. In photographic applications, the cover may be both light and air tight. In cases where a cover is not used, side walls may be provided extending along the track plate, the upper portions of the side walls being curved or bent inwardly over the edges of the strips to prevent excessive movement away from the upper surface of the track plate. To provide additional control over the velocity of the strips through the conveyor, at least one second row of gas flow apertures may be provided between the centrally located first row and one side edge of the track plate; and at least one third row of gas flow apertures may be provided between the centrally located first row and the other side edge of the track plate. However, each aperture in such second and third rows extends through the track plate from the pressure chamber and is angled in a direction opposite to the direction of movement of such strips, the apertures in the second row also being angled toward the one side edge and the apertures in the third row also being angled toward the other side edge. Preferably, the pressure chamber is divided into separate chambers for the first, second and third rows of apertures, thus permitting independent pressurization of each chamber. Preferably, means are provided for directing gas escaping from beneath such strips back onto the upper surfaces of the strips to flatten them as they are propelled through the conveyor. In one embodiment, such means for directing comprises a cover of the type previously mentioned and a cylindrical baffle positioned within the passage defined by the cover and the upper surface of the track plate to direct such escaping gas onto the upper surface of such strips. In another embodiment, such means for directing comprises side walls extending along the track plate, the walls comprising an upper portion curved inwardly above the track plate to direct the escaping gas onto the upper surface of such strips.

The apparatus according to the invention comprises distinctly fewer air flow apertures of a distinctly smaller area than have been used in the prior art, and thus avoids the necessity of a system of exhaust channels to remove excess air. This feature significantly reduces manufacturing costs, air consumption and noise generation. More importantly, this feature makes practical the construction of completely enclosed, light and air tight conveyors of considerable length and minimum cross-section, which can transport extremely thin and flexible strips having considerable length and exhibiting both longitudinal and transverse curl, substantially without flutter or face contact.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
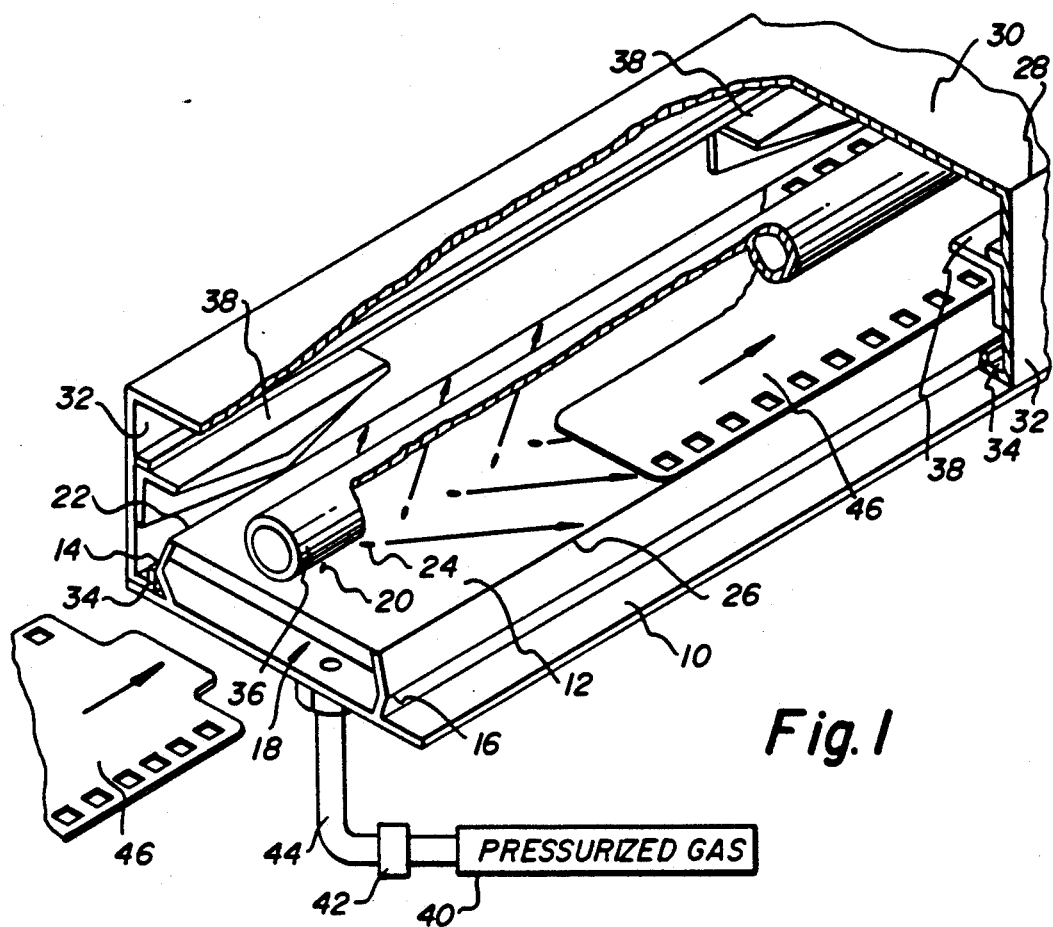
FIG. 1 shows a fragmentary perspective view, partially broken away, of one embodiment of the invention.

The following is a detailed description of the preferred embodiments of the invention, reference being made to the drawings in which the same reference numerals identify the same elements of structure in each of the several Figures.

In FIG. 1, one embodiment of the air film conveyor according to the invention is seen to comprise a rigid base plate 10 whose axis may be straight, curved or helically looped. Positioned above and typically parallel to base plate 10 is a rigid track plate 12 which, in the illustrated embodiment, has an essentially flat, smooth upper surface and a transverse width approximately equal to that of the strips to be conveyed. Various profiles for the upper surface of track plate 12 will produce acceptable results; however, for applications where the strips to be conveyed have an essentially constant transverse curvature upward, it has been found that a track surface works very well which has a transverse curvature slightly less than that of the strips to be conveyed, such as illustrated schematically in FIG. 8. For photographic film products, however, the strips have various transverse curvatures both upward and downward; therefore, the essentially flat surface is preferred for such applications. Track plate 12 is supported by outwardly bowed side walls 14, 16 whose longitudinal edges are sealed to track plate 12 and base plate 10 to define beneath track plate 12 a pneumatic pressure chamber 18 which extends along the length of track plate 12. Pressure chamber 18 is plugged at each end by means not illustrated.

Figure 2:
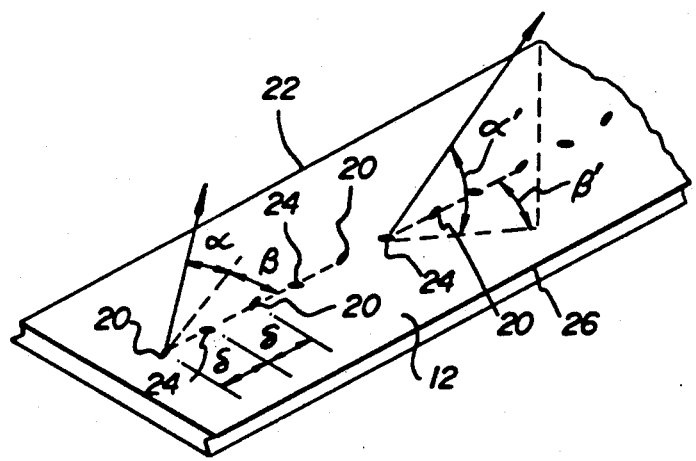
FIG. 2 shows a fragmentary perspective view of the track plate of the embodiment of FIG. 1, illustrating the location and orientation of its gas flow apertures.

Along track plate 12 substantially at its center is a row of gas flow apertures so defined by bores which extend at a compound angle from pressure chamber 18 through the thickness of track plate 12. As shown in FIG. 2, alternate gas flow apertures 20 extend toward the desired direction of movement of strips through the conveyor but at an angle $\alpha$ to the upper surface of track plate 12 and at an angle $\beta$ from the longitudinal axis of track plate 12 toward one side edge 22; while the other gas flow apertures 24 also extend toward the desired direction, but at an angle $\alpha'$, typically equal to angle $\alpha$, to the upper surface of track plate 12 and at an angle $\beta'$, typically equal to angle $\beta$ from the longitudinal axis, toward the other side edge 26. As illustrated, angles $\alpha$ and $\alpha'$ and angles $\beta$ and $\beta'$ are each acute angles. The inclination of apertures 20,24 at angles α and α' with respect to the upper surface of track plate 12 causes gas issuing from the apertures to propel an overlying strip along track plate 12, due to viscous drag effects between the high velocity gas and the strip. The alternating orientation of apertures 20,24 at angles β and β' toward opposite side edges 22,26 prevents gas from accumulating under the center of the strip and inducing flutter. Apertures 20,24 preferably are more or less aligned with the centerline of track plate 12, but may be positioned slightly to either side of the centerline without departing from the scope of our invention. Preferably, apertures 20,24 are equally spaced along track plate 12 at a distance δ from one another; however, unequal spacing between the apertures is also acceptable. Those skilled in the art will appreciate that by varying the angles α and β and the spacing δ, the velocity of, and tension induced in, strips of material may be adjusted to suit a particular application, without departing from the scope of our invention.

A cover 28 is provided which may be made of a light tight material when strips of photographic film are to be conveyed and which comprises a top wall 30 and a pair of depending side walls 32 having at their lower ends laterally inwardly projecting flanges 34 which snap beneath outwardly bowed side walls 14,16 to hold cover 28 in place. Supported from the underside of cover 28 is an elongated cylindrical gas flow baffle 36, which may be made for example from polished metal tubing. Baffle 36 is positioned centrally above the row of apertures 20,24 and, as will be discussed in more detail below, serves to direct gas escaping from beneath conveyed strips of material back onto the upper surfaces of the strips to flatten them during movement through the conveyor. The interior of cylindrical baffle 36 is not pressurized, the redirection of escaping gas being caused just by the presence of the baffle above the track plate. To limit the movement of the side edges of such strips laterally and vertically away from track plate 12, a plurality of edge guide flanges 38 are attached at longitudinally spaced locations to the inside surfaces of side walls 32 and extended inwardly above and downwardly adjacent side edges 22,26. So that L-shaped guide flanges 38 will not mar the edges or upper surfaces of the strips, each leg of the L-shaped flange thickens gradually from its side edges toward the center line of the flange and the surfaces facing the strips are highly polished. Gas is directed into pressure chamber 18 from a source 40 of pressurized gas, such as an air compressor, via a control valve 42 and conduit 44.

In operation of the embodiment of FIG. 1, strips 46 of web material such as photographic film are inserted into the conveyor above track plate 12. In one embodiment for use with 35 mm film, gas flow apertures 20,24 were 0.572 mm (0.0225 in) in diameter; angles α and α' were 45 degrees; angles β, β' were 20 degrees; the spacing δ between apertures was 0.762 cm (0.300 in); and pressure chamber 18 was pressurized with air to the range of 6.895 to 20.685 kPa (1 to 3 psi). Strips 46 floated approximately 0.0508 cm (0.020 in) above the surface of track plate 12 as they moved through the conveyor at speeds up to 792.5 meters per minute (2600 fpm). The air impinged on the undersides of strips 46, causing them to float at a stable and predictable height above the surface of the track plate, a result explained by the Bernoulli Principle. The Bernoulli effect was strong enough to remove most of the longitudinal curl from the strips and would support the web against substantial loads either toward or away from the track plate. Air escaping from beneath the side edges of strips 46, as shown schematically by the arrows in FIGS. 1 and 3, was directed down onto the top surfaces of the strips, thus removing additional longitudinal curl, by means of cover 28, a 0.953 cm (0.375 in) diameter cylindrical baffle 36 positioned approximately 0.228 cm (0.090 in) above the track plate and, to some extent, by longitudinally spaced edge guides 38. At the discharge end of the conveyor, not illustrated, the conveyed strips have sufficient velocity to pass directly across a short gap into the inlet of a subsequent apparatus such as a spooler, without requiring intervention by the operator.

Figure 3:
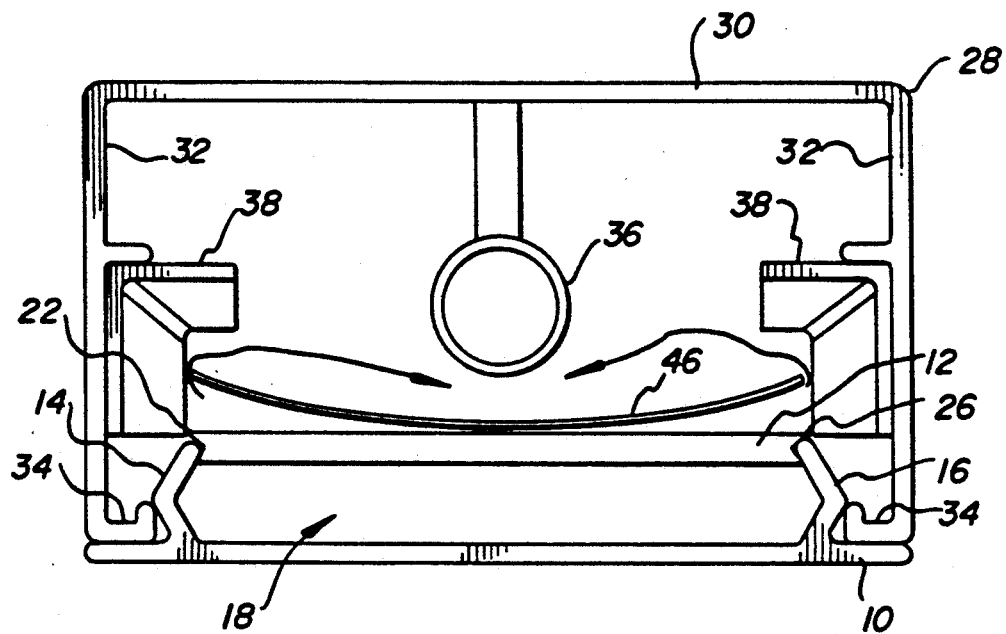
FIG. 3 shows an end view of the embodiment of FIG. 1.
Figure 4:
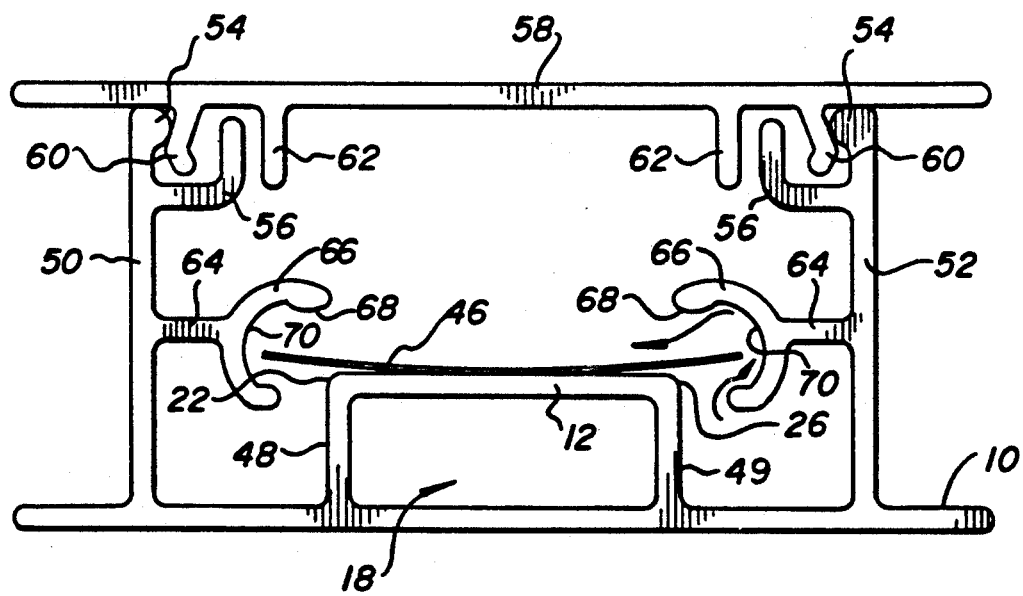
FIG. 4 shows an end view of a modified version of the embodiment of FIG. 1.

FIG. 4 illustrates a modified version of the embodiment of FIG. 1. Here, the entire conveyor is assembled from two extruded parts, which may be made from aluminum, for example. Track plate 12 is supported above base plate 10 by a pair of integral side walls 48,49 formed integrally with plates 10,12. Formed integrally with and extended upwardly from base plate 10 on either side of pressure chamber 18 are a pair of side walls 50,52 having at their upper ends integrally formed and longitudinally extended beads 54 and, running beneath beads 54, inwardly and upwardly extended L-shaped light blocking flanges 56. A top plate 58 rests on the upper edges of side walls 50,52 and comprises integrally formed, downwardly and outwardly extended longitudinal locking flanges 60 which cooperate with beads 54 to permit top plate 58 to be snap locked in place. Inboard of flanges 56, top plate 58 comprises a pair of integrally formed, downwardly extended light blocking flanges 62. Below light blocking flanges 56, side walls 50,52 support integrally formed, inwardly and longitudinally extended ribs 64 at whose inner ends are integrally formed a pair of inwardly faced concave gas flow and film strip guides 66. Preferably, ribs 64 and strip guides 66 extend continuously along the length of the conveyor. Along its upper edge, each guide 66 comprises a downwardly faced, longitudinally extended convex bead 68. Film strips moving through the conveyor tend to be curled longitudinally upwardly at their tail ends; and beads 68, which are polished smooth to prevent marring, control the degree of upward movement of the tail ends. Lateral movement of the strips is limited by the concave surfaces 70 of guides 66. Where strip 46 is approximately 35 mm (1.38 in) in width, concave surfaces 70 preferably should be approximately 1.3 mm (0.051 in) from the edges of the strip over the anticipated range of transverse upward curl of the strip as shown in FIG. 4. For 35 mm strips which curl transversely upward, the transverse radius of curvature of the strip should be greater than 30 mm (1.181 in) for proper conveying. For 35 mm strips which curl transversely downward, the transverse radius of curvature should be greater than 500 mm (19.68 in) to avoid contact of the edges of the strip with the surface of the track plate. Air flowing beneath the side edges of strip 46 is redirected onto the top surface of the strip by surfaces 70 and beads 68, as indicated by the arrows in FIG. 4. In the embodiment of FIG. 3, there is sufficient space between the edges of support surface 12 and the walls of cover 28 between edge guide flanges 38 to permit the air to escape from beneath the strip without inducing unacceptable flutter of the strip. However, in the embodiment of FIG. 4, longitudinally continuous strip guides 66 would constrict the flow of escaping air if the width of support surface 12 approximated that of strip 46. So, in the embodiment of FIG. 4, the width of the support surface is necessarily smaller than that of the strip. This tends to reduce the web flattening and stabilizing characteristics of the embodiment of FIG. 4, but is necessary to permit a sufficient quantity of air to escape from beneath the film without inducing flutter. To further reduce the tendency of the web to flutter, edges 22,26 preferably are rounded, so that they aid in this regard by directing the escaping air downward due to the Coanda effect. Though the conveyor of FIG. 4 is somewhat less stable than that of FIG. 3, it offers improved guidance of the strip, is less expensive to fabricate and is more useful with strips which are curled downwardly. A baffle 36 is not required in this embodiment; however, the use of one is within the scope of our invention. In this embodiment, the spacing between the apertures 20,24 was increased to 0.838 cm (0.33 in), which was found to increase web stability, particularly for webs longer than about 1.83 meters (6 ft.). Because the conveyor of this embodiment is made from two extruded parts, the expense of fabricating and assembling the separate parts of the embodiment of FIG. 1 was eliminated, without sacrificing performance.

Figure 5:
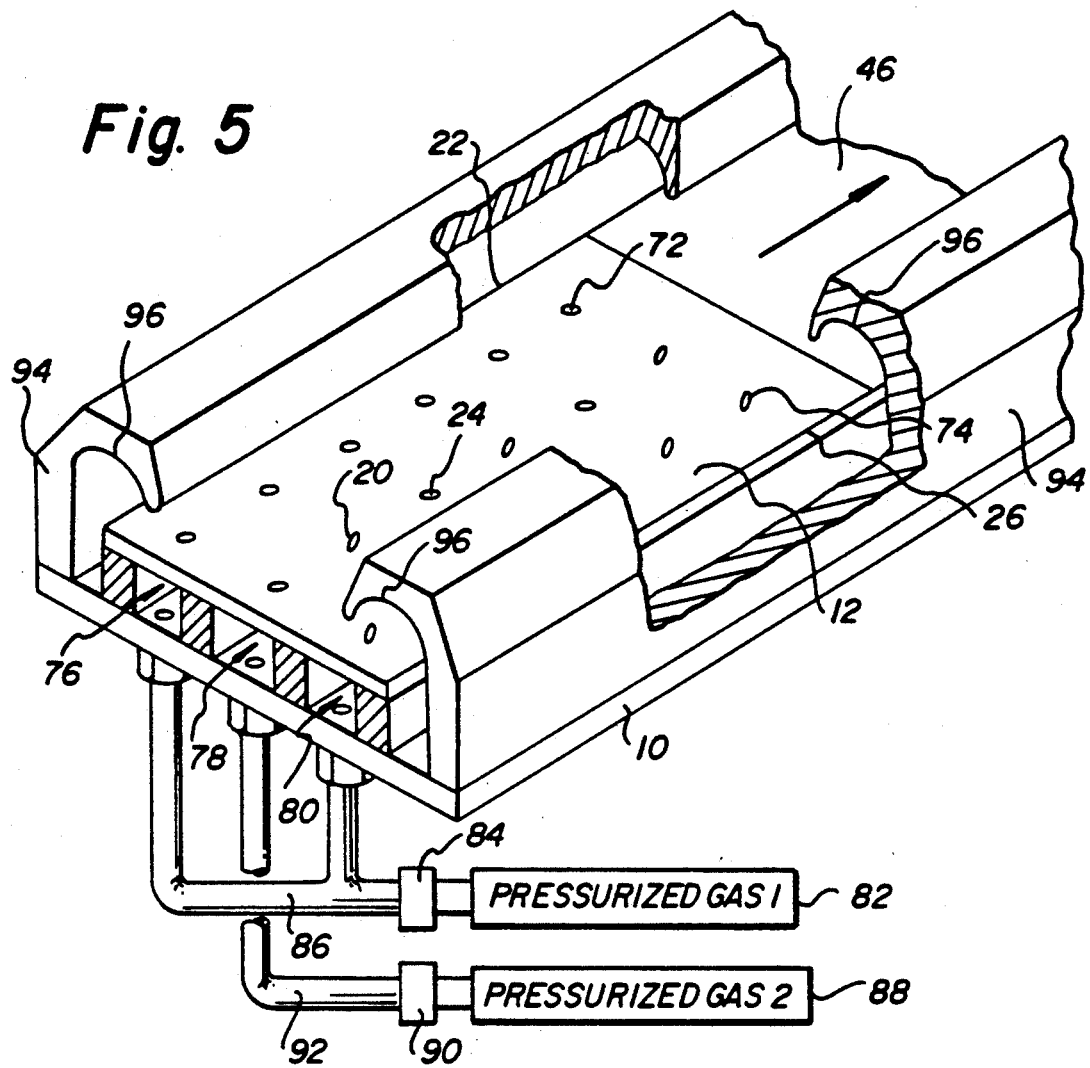
FIG. 5 shows a fragmentary perspective view, partially broken away, of another embodiment of the invention.
Figure 6:
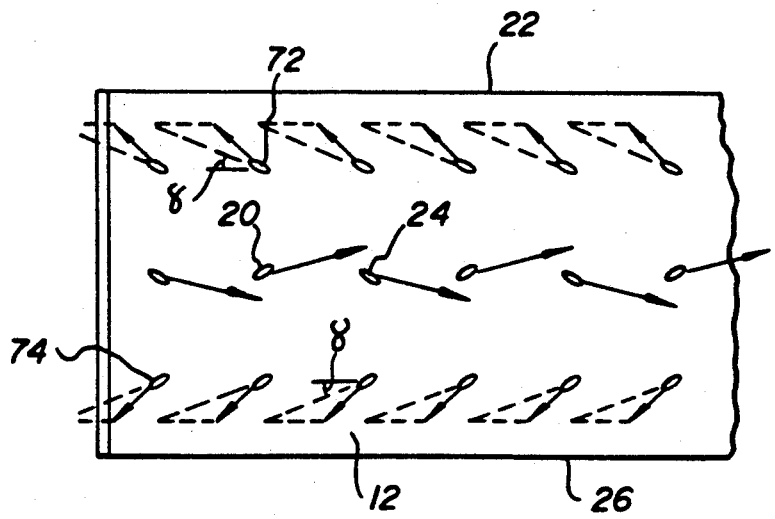
FIG. 6 shows a fragmentary perspective view of the track plate of the embodiment of FIG. 5, illustrating the location and orientation of its gas flow apertures.

For strips of wider web material, such as 62 mm photographic film, the embodiment of FIGS. 5 and 6 is preferred. In this case, the axial spacing δ between apertures 20,24 preferably is approximately doubled to about 1.524 cm (0.600 in), while angles α, α' and β, β' remain unchanged. Two additional rows of gas flow apertures 72,74 are provided near side edges 22,26. For 62 mm material, the rows of apertures 72,74 preferably are spaced approximately 1.905 cm (0.75 in) on either side of and essentially parallel to the central row of apertures 20,24. Unlike apertures 20,24, apertures 72,74 extend opposite to the desired direction of movement of strips through the conveyor and at preferably the same angle to the upper surface of track plate 12, but at preferably equal angles γ of about 20 degrees toward side edges 22,26, as shown in FIG. 6. In this embodiment, gas flowing through the central row of apertures 20,24 simultaneously controls the web float height, lengthwise curl and acceleration. Gas flowing through the additional rows of apertures 72,74 allows the web's velocity and acceleration to be controlled independent of float height, helps to control the direction of travel of the web and contributes to reduction of both lengthwise and widthwise curl of the web. To achieve these added benefits, pressure chamber 18 is divided into three separate chambers 76,78,80 which communicate separately with the rows of apertures 72; 20,24; and 78, respectively. Gas is directed into pressure chambers 76,80 from a source 82 of pressurized gas, such as an air compressor, via a control valve 84 and conduit 86; while gas for pressure chamber 78 comes from a source 88 via a control valve 90 and conduit 92. By varying the pressures acting in pressure chambers 76,80 relative to that acting in pressure chamber 78, the velocity and acceleration of the strips can be controlled independently of the support function provided by air from pressure chamber 78. As in the case of the embodiment of FIG. 1, the sizes and angles of the flow apertures also may be varied to change the velocity and acceleration of the strips, without departing from the scope of our invention.

Adjacent to track plate 12, the conveyor is provided with a pair of side walls 94 having upper portions 96 which are curved inwardly and then downwardly above the edges of the track plate to direct gas escaping from beneath the strips 46 back onto their upper surfaces, to flatten the strips as they move through the conveyor. Curved portions 96 also function as edge guides to enable even exceptionally curly strips to pass through the conveyor under control. In general, the function of curved portions 96 is the same as that of guides 66 in the embodiment of FIG. 4. If desired, a cover such as cover 40 of FIG. 1 also may be used with this embodiment. The embodiment of FIGS. 5 and 6 also may be made from simple extruded parts, as in the case of the embodiment of FIG. 4, as will be appreciated by those skilled in the art.

Figure 7:
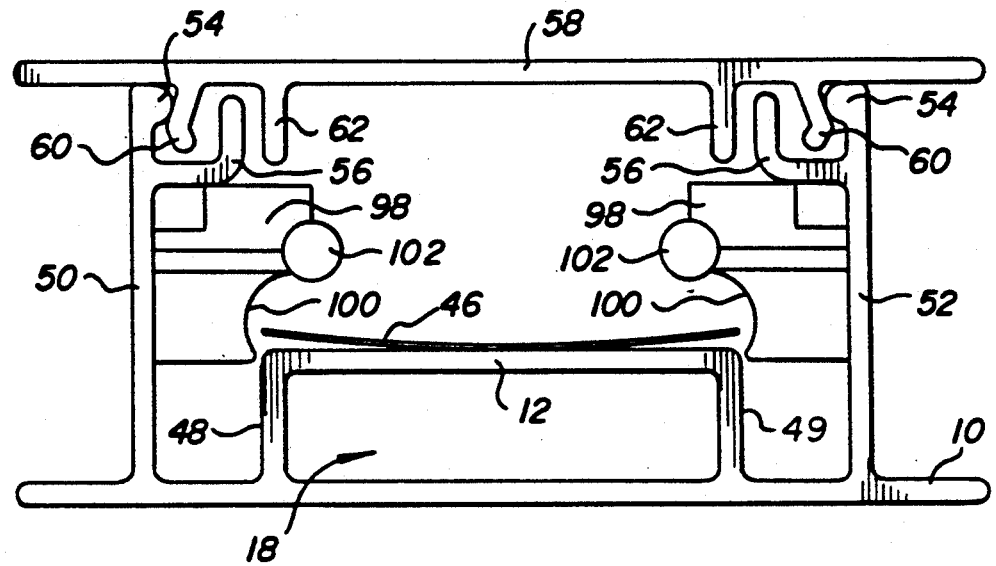
FIGS. 7 and 8 show end views of alternative embodiments of the invention.
Figure 8:
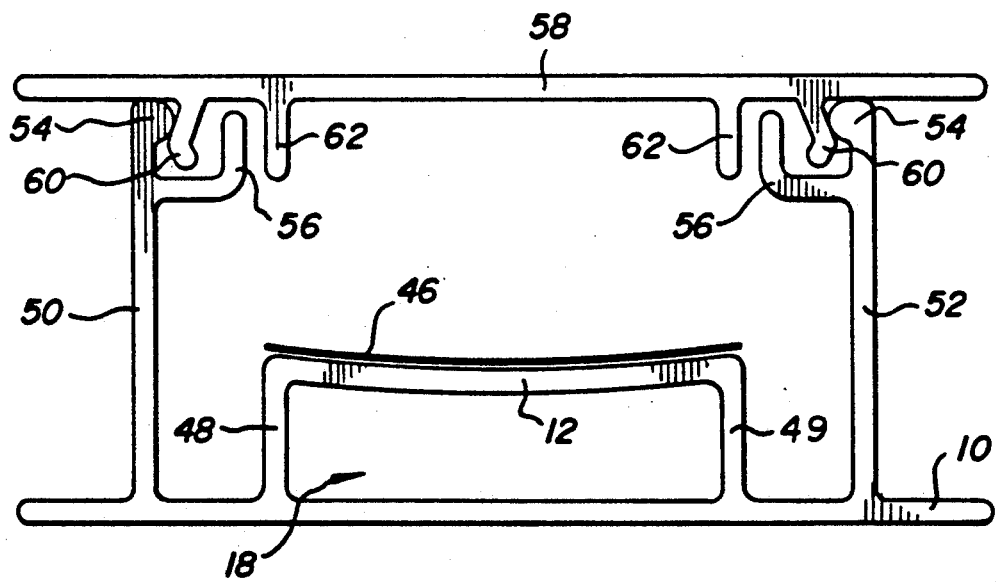

While our invention has been shown and described with reference to particular embodiments thereof, those skilled in the art will understand that various modifications in the form and detail of the illustrated structure may be made without departing from the spirit and scope of our invention. For example, in the embodiment illustrated in FIG. 7, the upper surface of track plate extends to approximately the full width of strip 46 and edge guide flanges 98 are attached at longitudinally spaced locations to the inside surfaces of side walls 50,52. Longitudinally extended, cylindrical air flow guide surfaces 100 are provided on the undersides of guide flanges 98; while longitudinally extending, continuous guide rods 102 are attached to the inner faces of guide flanges 98. Thus, this embodiment combines the spaced guide flanges of the embodiment of FIG. 1 with the some of the continuous guide surfaces of the embodiment of FIG. 4. FIG. 8, as mentioned previously, shows an embodiment in which the upper surface of track plate 12 extends to approximately the full width of strip 46 and is transversely concave, preferably with a radius somewhat less than the anticipated transverse curl radius of strip 46.

Having thus described our invention in sufficient detail to enable those skilled in the art to make and use it, we claim as new and desire to secure Letters Patent for:

1. A gas film conveyor for moving elongated strips of web material, said conveyor comprising:
   an elongated track plate having side edges and an upper surface;
   a pneumatic pressure chamber positioned beneath and bounded on its upper side by said track plate;
   means for directing pressurized gas into said pressure chamber;
   at least one first row of gas flow apertures arranged along said track plate substantially at the center thereof, each of said apertures being defined by a bore extended at a compound angle through said track plate from said pressure chamber in the direction of movement of such strips along said conveyor, each of said apertures having said bore thereof at a first acute angle to said upper surface, said apertures also having said bores thereof at a second acute angle from said direction of movement, said second acute angle being alternately toward one and then the other of said side edges, said first and second acute angles being such that gas flowing through said apertures will support such strips above said upper surface while propelling such strips in said direction of movement; and
   means for directing gas escaping from beneath the side edges of such strips back onto the upper surface of such strips to flatten such strips as they are propelled through said conveyor.

2. A gas film conveyor according to claim 1, wherein said means for directing gas comprises a cover positioned above said track plate to define a passage through which such strips move and an elongated cylindrical baffle positioned within said passage and above said center of said upper surface to direct said escaping gas onto the upper surface of such strips.

3. A gas film conveyor according to claim 2, further comprising means attached to said cover for guiding the edges of such strips to prevent excessive movement away from said upper surface.

4. A gas film conveyor according to claim 1, wherein said means for directing gas comprises a pair of side walls extending along said track plate, each said side wall comprising a portion curved inwardly above said track plate to direct said escaping gas onto the upper surface of such strips.

5. A gas film conveyor according to claim 4, wherein said portion curves over the edges of such strips to prevent excessive movement away from said upper surface.

6. A gas film conveyor according to claim 1 further comprising:
at least one second row of gas flow apertures arranged between said at least one first row and one of said side edges;
at least one third row of gas flow apertures arranged between said at least one first row and the other of said side edges;
each aperture in said second and third rows being extended through said track plate from said pressure chamber and being angled relative to said upper surface in a direction opposite to the direction of movement of such strips along said conveyor, said apertures in said second row also being angled toward said one side edge and said apertures in said third row also being angled toward said other side edge, whereby gas flowing through said apertures in said second and third rows will support such strips above said upper surface while controlling the velocity and acceleration of such strips through said conveyor.

7. A gas film conveyor according to claim 6, wherein said pressure chamber is divided into separate chambers for said first, second and third rows of apertures and said means for directing pressurized gas is capable of pressurizing said chambers to different pressures.

8. A gas film conveyor according to claim 7, wherein said means for directing gas comprises a pair of side walls extending along said track plate, each said side wall comprising an upper portion curved inwardly above said track plate to direct said escaping gas onto the upper surface of such strips.

9. A gas film conveyor according to claim 8, wherein said upper portion curves over the edges of such strips to prevent excessive movement away from said upper surface.

10. A gas film conveyor according to claim 1, wherein said upper surface is substantially flat.

11. A gas film conveyor according to claim 1, wherein said upper surface is transversely curved.

12. A gas film conveyor for moving elongated strips of web material, said conveyor comprising:
an elongated track plate having side edges and an upper surface;
a pneumatic pressure chamber positioned beneath and bounded on its upper side by said track plate;
means for directing pressurized gas into said pressure chamber; and
at least one first row of gas flow apertures arranged along said track plate substantially at the center thereof, each of said apertures being defined by a bore extended at a compound angle through said track plate from said pressure chamber in the direction of movement of such strips along said conveyor, each of said apertures having said bore thereof at a first acute angle to said upper surface, said apertures also having said bores thereof at a second acute angle from said direction of movement, said second acute angle being alternately toward one and then the other of said side edges, said first and second acute angles being such that gas flowing through said apertures will support such strips above said upper surface while propelling such strips in said direction of movement.

13. A gas film conveyor according to claim 12, further comprising a cover positioned above said track plate to define a passage through which such strips move.

14. A gas film conveyor according to claim 13, further comprising means attached to said cover for guiding the edges of such strips to prevent excessive movement away from said upper surface.

15. A gas film conveyor according to claim 12, further comprising a pair of side walls extending along said track plate, each said side wall comprising a portion curved inwardly over the edges of such strips to prevent excessive movement away from said upper surface.

16. A gas film conveyor according to claim 12 further comprising:
at least one second row of gas flow apertures arranged between said at least one first row and one of said side edges;
at least one third row of gas flow apertures arranged between said at least one first row and the other of said side edges;
each aperture in said second and third rows being extended through said track plate from said pressure chamber and being angled relative to said upper surface in a direction opposite to the direction of movement of such strips along said conveyor, said apertures in said second row also being angled toward said one side edge and said apertures in said third row also being angled toward said other side edge, whereby gas flowing through said apertures in said second and third rows will support such strips above said upper surface while controlling the velocity and acceleration of such strips through said conveyor.

17. A gas film conveyor according to claim 16, wherein said pressure chamber is divided into separate chambers for said first, second and third rows of apertures and said means for directing pressurized gas is capable of pressurizing said chambers to different pressures.

18. A gas film conveyor according to claim 17, further comprising a pair of side walls extending along said track plate, each said side wall comprising an upper portion curved inwardly over the edges of such strips to prevent excessive movement away from said upper surface.

19. A gas film conveyor according to claim 12, wherein said upper surface is transversely curved.

20. A gas film conveyor according to claim 12, wherein said upper surface is substantially flat.

* * * * *